(12) United States Patent
Tasaka et al.

(10) Patent No.: US 6,815,496 B2
(45) Date of Patent: Nov. 9, 2004

(54) THERMOPLASTIC ELASTOMER COMPOSITION, AND FORMED ARTICLE AND COMPOSITE FORMED ARTICLE USING THE SAME

(75) Inventors: Michihisa Tasaka, Kawasaki (JP); Takaaki Suka, Tokyo (JP)

(73) Assignee: Riken Technos Corp., Tokyo (JP)

( * ) Notice: Subject to any disclaimer, the term of this patent is extended or adjusted under 35 U.S.C. 154(b) by 0 days.

(21) Appl. No.: 10/227,535

(22) Filed: Aug. 26, 2002

(65) Prior Publication Data

US 2003/0100659 A1 May 29, 2003

(30) Foreign Application Priority Data

Oct. 19, 2001 (JP) ........................................ 2001-321953
Apr. 9, 2002 (JP) ........................................ 2002-106608

(51) Int. Cl.$^7$ ............................ C08L 25/06; C08L 25/08
(52) U.S. Cl. ............................ 525/50; 525/241; 525/64; 525/80; 525/77; 525/86
(58) Field of Search ............................ 525/214, 50, 64, 525/80, 77, 86

(56) References Cited

U.S. PATENT DOCUMENTS 5,936,037 A     8/1999    Tasaka ..................... 525/92 B

FOREIGN PATENT DOCUMENTS

| EP | 0 770 645 A | 5/1997 |
| EP | 0 810 262 A | 12/1997 |
| EP | 0 810 262 A1 * | 12/1997 |
| EP | 0 845 498 A | 6/1998 |
| JP | 2000-978 | 1/2000 |
| JP | 2000-17141 | 1/2000 |

* cited by examiner

*Primary Examiner*—Ling-Siu Choi
(74) *Attorney, Agent, or Firm*—Armstrong, Kratz, Quintos, Hanson & Brooks, LLP

(57) ABSTRACT

It is an object of the present invention to provide a thermoplastic elastomer composition excellent in softness, permanent compression set (both short- and long-term) and resistance to oil, and controlled in bleed-out of the softening agent. It is another object of the present invention to provide a formed article and composite formed article of the above thermoplastic elastomer composition. The present invention provides a thermoplastic elastomer composition containing (a) 100 parts by weight of at least one hydrogenated block copolymer, (b) 30 to 150 parts by weight of a non-aromatic-based softening agent for rubber and (c) 3 to 100 parts by weight of a thermoplastic resin having a melting point of 70 to 140° C., determined by the DSC analysis, and melt viscosity of 400 to 100,000 cps at 140° C., and formed article and composite formed article thereof.

14 Claims, 1 Drawing Sheet

THERMOPLASTIC ELASTOMER COMPOSITION, AND FORMED ARTICLE AND COMPOSITE FORMED ARTICLE USING THE SAME

BACKGROUND OF THE INVENTION

1. Field of the Invention

This invention relates to a thermoplastic elastomer composition, and formed article and composite formed article of the same; more particularly to a thermoplastic elastomer composition excellent in softness, permanent compression set (both short- and long-term) and moldability, and controlled in bleed-out of the softening agent, and a formed article and composite formed article of the same.

2. Description of the Prior Art

Recently, thermoplastic elastomers, which are soft materials with rubber elasticity, need no vulcanization, and are as moldable and recyclable as thermoplastic resins, have been widely used in various areas, such as automobile parts, home electric appliances, wire coatings, medical equipment parts, footwear and miscellaneous goods.

Of thermoplastic elastomers, polystyrene-based ones, e.g., styrene-butadiene block copolymer (SBS) and styrene-isoprene block copolymer (SIS) as aromatic vinyl compound and conjugated diene compound block copolymers, are highly soft, have good rubber elasticity at normal temperature and give highly moldable thermoplastic elastomer compositions. As such, they are widely used as substitutes for vulcanized rubber.

The elastomer composition of styrene and conjugated diene block copolymer, as one type of the above elastomers, whose intramolecular double bonds are hydrogenated, is more widely used as the one having improved resistance to aging under heat (thermal stability) and to weather.

However, the thermoplastic elastomer composition containing the hydrogenated block copolymer still has some problems regarding its rubber characteristics, e.g., resistance to oil, deformation rate (permanent compression set) and rubber elasticity at high temperature. The compositions containing a hydrogenated derivative of the above block copolymer have been crosslinked to improve the above characteristics, and these crosslinked compounds are disclosed, e.g., by Japanese Patent Laid-open Publication Nos.S59-6236 and S63-57662, and Japanese Patent Publication Nos.H3-49927, H3-11291 and H6-13628.

However, the crosslinked compositions of hydrogenated block copolymers disclosed by the above patent publications still have problems of insufficient permanent compression set at high temperature, in particular, at 100° C., and of tending to lose mechanical strength. Therefore, they are still short of the performance level which has been required in the areas for vulcanized rubber, as matters now stand. Moreover, they involve many moldability-related problems, e.g., low melt tension of the extruded article at high temperature, deteriorating in its ability to keep its shape, and extended molding cycles of injection-molded articles.

Each of the compositions disclosed by the above patent publications has a Shore A hardness of 40 or more, and is softened by increasing their softening agent content. However, this causes practical problems, e.g., sticky surfaces of the molded article and bleed-out of the softening agent in the presence of stress under heating, as matters now stand.

It is an object of the present invention to provide a thermoplastic elastomer composition excellent in softness, permanent compression set (both short- and long-term) and resistance to oil, and controlled in bleed-out of the softening agent. It is another object of the present invention to provide a formed article and composite formed article of the above thermoplastic elastomer composition.

SUMMARY OF THE INVENTION

The inventors of the present invention have found, after having extensively studied to achieve the above objects, that a thermoplastic elastomer composition excellent in softness, permanent compression set and moldability, and controlled in bleed-out of the softening agent can be obtained by melting and kneading a specific, hydrogenated block copolymer elastomer with a thermoplastic resin of low melting point and melt viscosity, thereby achieving the present invention.

The first aspect of the invention is a thermoplastic elastomer composition containing:

(a) 100 parts by weight of at least one hydrogenated block copolymer selected from the group consisting of:
  (a-1) a hydrogenated block copolymer obtained by hydrogenating a block copolymer composed of at least 2 polymer blocks A mainly based on an aromatic vinyl compound and at least one polymer block B mainly based on a conjugated diene compound, and
  (a-2) a hydrogenated block copolymer obtained by hydrogenating a block copolymer based on a conjugated diene compound;
(b) 30 to 150 parts by weight of a non-aromatic-based softening agent for rubber; and
(c) 3 to 100 parts by weight of a thermoplastic resin having a melting point of 70 to 140° C., determined by DSC analysis, and a melt viscosity of 400 to 100,000 cps at 140° C.

The second aspect of the invention is the thermoplastic elastomer composition of the first aspect, which further contains (d) 0.01 to 3 parts by weight of an organic peroxide.

The third aspect of the invention is the thermoplastic elastomer composition of the first or second aspects, wherein the thermoplastic resin as the component (c) is of at least one thermoplastic resin selected from the group consisting of non-polar resin and resin having a polar group.

The fourth aspect of the invention is the thermoplastic elastomer composition of the third aspect, wherein the non-polar resin is a polyethylene wax.

The fifth aspect of the invention is the thermoplastic elastomer composition of the third aspect, wherein the resin having a polar group is of at least one of the resins selected from the group consisting of ionomer, ethylene/acrylic acid copolymer, ethylene/vinyl acetate copolymer, saponified ethylene/vinyl acetate copolymer, polyamide-based resin, polyamide-based thermoplastic elastomer, biodegradable polyester-based resin, polyester-based resin, polyester-based thermoplastic elastomer, polyurethane-based resin and polyurethane-based thermoplastic elastomer.

The sixth aspect of the invention is the thermoplastic elastomer composition of the first or second aspects, which further contains (e) 0.1 to 5 parts by weight of liquid polybutadiene containing hydroxyl group at the terminal or derivative thereof, when the component (c) is a polar resin.

The seventh aspect of the invention is the thermoplastic elastomer composition of the first or second aspects, which further contains (f) 0.1 to 5 parts by weight of an unsaturated glycidyl compound or derivative thereof, when the component (c) is a polar resin.

The eighth aspect of the invention is the thermoplastic elastomer composition of the first or second aspects, which further contains (g) 0.1 to 5 parts by weight of an unsaturated carboxylic acid or derivative thereof, when the component (c) is a polar resin.

The ninth aspect of the invention is the thermoplastic elastomer composition of the first or second aspects, which further contains (h) 0.1 to 10 parts by weight of an ester-based crosslinking aid.

The tenth aspect of the invention is the thermoplastic elastomer composition of the first or second aspects, which further contains (i) 0.1 to 25 parts by weight of a peroxide-decomposed type polyolefin resin.

The eleventh aspect of the invention is a formed article composed of the thermoplastic elastomer composition of the first or second aspects.

The twelfth aspect of the invention is an elastic part composed of the formed article of the eleventh aspect for medical, food or bubble jet printer purpose.

The thirteen aspect of the invention is a thermal adhesiveness composite article composed of the formed article of the eleventh aspect and a formed article of polypropylene-based resin adhered to each other under heating.

The fourteenth aspect of the invention is an elastic part composed of the thermal adhesiveness formed article of the thirteenth aspect for medical, food or bubble jet printer purpose.

NOTATION

Figure 1:
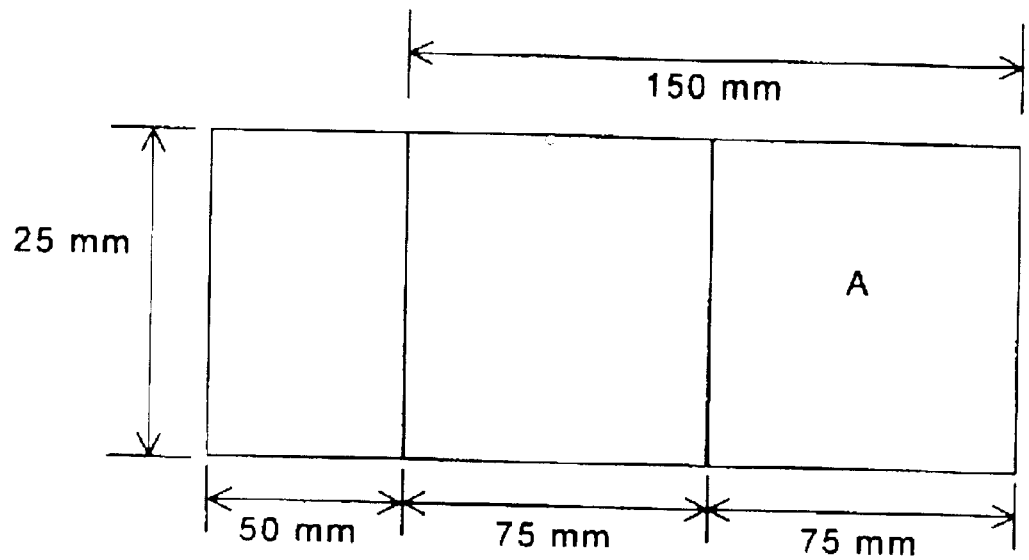
FIG. 1 is a front view of the test piece for determining peel back strength.

1 Test piece
2 Plate of the thermoplastic elastomer composition
3 Plate of a polypropylene resin
4 Paper
A Thermal adhesiveness area.

DETAILED DESCRIPTION OF THE INVENTION

The thermoplastic elastomer composition of the present invention is described herein below in more detail of its components, method of production, purposes and so on.

1. Components of the Thermoplastic Elastomer Composition (1) At least one hydrogenated block copolymer selected from the group consisting of: (a-1) a hydrogenated block copolymer obtained by hydrogenating a block copolymer composed of at least 2 polymer blocks A mainly based on an aromatic vinyl compound and at least one polymer block B mainly based on a conjugated diene compound, and (a-2) a hydrogenated block copolymer obtained by hydrogenating a block copolymer based on a conjugated diene compound as the component (a).

The hydrogenated block copolymer (a-1) for the thermoplastic elastomer composition of the present invention, obtained by hydrogenating a block copolymer composed of at least 2 polymer blocks A mainly based on an aromatic vinyl compound and at least one polymer block B mainly based on a conjugated diene compound, is a polymer obtained by hydrogenating a block copolymer composed of at least 2 polymer blocks A mainly based on an aromatic vinyl compound and at least one polymer block B mainly based on a conjugated diene compound. The examples of the hydrogenated block copolymer (a-1) are the hydrogenated block copolymers of an aromatic vinyl compound and conjugated diene compound, having the structure of A-B-A, B-A-B-A or A-B-A-B-A.

The polymer block A mainly based on an aromatic vinyl compound may be composed only of the aromatic vinyl compound or a copolymer of the aromatic vinyl compound and another optional component, e.g., conjugated diene compound, accounting for less than 50% by weight.

The polymer block B mainly based on a conjugated diene compound may be composed only of the conjugated diene compound or a copolymer of the conjugated diene compound and another optional component, e.g., aromatic vinyl compound, accounting for less than 50% by weight.

The aromatic vinyl compounds useful for the present invention include styrene, a-methyl styrene, vinyl toluene and p-tert-butyl styrene. They may be used either individually or in combination. Of the above compounds, styrene is more preferable. The conjugated diene compounds useful as the optional component of the polymer block A include butadiene, isoprene, 1,3-pentadiene and 2,3-dimethyl-1,3-butadiene. They may be used either individually or in combination. Of the above compounds, butadiene, isoprene and a mixture of these compounds are more preferable.

The polymer block B mainly based on a conjugated diene compound for the hydrogenated block copolymer, obtained by hydrogenating a block copolymer composed of at least 2 polymer blocks A mainly based on an aromatic vinyl compound and at least one polymer block B mainly based on a conjugated diene compound, is not limited in extent of hydrogenation. However, it is preferably 50% or more, more preferably 55% or more, still more preferably 60% or more. Its microscopic structure is also not limited. When the block B is composed only of butadiene, for example, the 1,2-microscopic structure preferably accounts for 20 to 50% by weight, particularly preferably 25 to 45% by weight, in the polybutadiene block. The 1,2-bond may be selectively hydrogenated for the block. When the block B is composed of a mixture of isoprene and butadiene, the 1,2-microscopic structure preferably accounts for 50% or less, more preferably 25% or less, still more preferably 15% or less.

When the block B is composed of isoprene as the single component, preferably 70 to 100% by weight of isoprene in the polyisoprene block has the 1,4-micro-structure, and preferably 90% or more of the aliphatic double bond derived from isoprene is hydrogenated.

When the hydrogenated block copolymer is used for specific purposes, the above hydrogenated compound can be preferably used, as required, for the purposes.

In each of the polymer block A mainly based on an aromatic vinyl compound and polymer block B mainly based on a conjugated diene compound, the distribution of the aromatic vinyl compound or conjugated diene compound in the molecular chain may be represented by random, taspered, partly block or an optional combination thereof. Where there are 2 or more polymer blocks A mainly based on an aromatic vinyl compound, they may be structurally the same or different, and so are polymer blocks B mainly based on a conjugated diene compound.

The block copolymer, obtained by hydrogenating a block copolymer composed of at least 2 polymer blocks A mainly based on an aromatic vinyl compound and at least one polymer block B mainly based on a conjugated diene compound, preferably has a number-average molecular weight of 5,000 to 1,500,000, more preferably 10,000 to 550,000, still more preferably 100,000 to 400,000. The molecular weight distribution is 10 or less. The molecular structure of the block copolymer may be of straight-chain, branched, radial or of an optional combination thereof.

The specific examples of the block copolymer, obtained by hydrogenating a block copolymer composed of at least 2 polymer blocks A mainly based on an aromatic vinyl compound and at least one polymer block B mainly based on a conjugated diene compound, include styrene-ethylene/butene-styrene copolymer (SEBS), styrene-ethylene/propylene-styrene copolymer (SEPS), styrene-ethylene/ethylene/propylene-styrene copolymer (SEEPS), and styrene-butadiene/butylene-styrene copolymer (partially hydrogenated styrene-butadiene-styrene copolymer, SBBS).

A number of methods have been proposed for producing the block copolymer, obtained by hydrogenating a block copolymer composed of at least 2 polymer blocks A mainly based on an aromatic vinyl compound and at least one polymer block B mainly based on a conjugated diene compound. One of the representative methods involves block polymerization effected in an inert medium in the presence of a lithium or Ziegler catalyst, as disclosed by Japanese Patent Publication No.S40-23798. The resultant block copolymer can be hydrogenated in an inert medium in the presence of a hydrogenation catalyst by a known method.

The hydrogenated block copolymers of a conjugated diene compound useful for the present invention as the (a-2) component include a block copolymer (CEBC) composed of a crystalline ethylene block and non-crystalline ethylene-butene block obtained by hydrogenating a block copolymer of butadiene. The hydrogenated block copolymers of a conjugated diene compound may be used either individually or in combination.

(2) Non-aromatic-based Softening Agent for Rubber as the Component (b)

The non-aromatic-based softening agents for rubber as the component (b) of the thermoplastic elastomer composition of the present invention include a non-aromatic-based mineral oil, and a liquid or low-molecular-weight synthetic agent. The softening agents of mineral oil for rubber are generally a mixture of an aromatic ring, naphthenic ring and paraffin chain compounds. They are distinguished from each other by the paraffin-, naphthene- and aromatic-based ones, when carbons in the paraffin chains account for 50% or more of the total carbons, those in the naphthene rings for 30 to 40%, and the aromatic ones for 30% or more, respectively.

The softening agents of mineral oil for rubber useful as the component (b) of the present invention are paraffin- or naphthene-based ones. Use of an aromatic-based softening agent is undesirable, because it will make the component (a) soluble to retard the crosslinking reactions with the result that properties of the resultant composition may not be improved. The component (b) for the present invention is preferably a paraffin-based one, and the one having a lower aromatic ring content is more preferable.

The non-aromatic-based softening agent for rubber preferably has a kinematic viscosity of 20 to 50,000 cSt at 37.8° C. and 5 to 1,500 cSt at 100° C., a pour point of −10 to −15° C., and a flash point (COC) of 170 to 300° C. Moreover, it preferably has a weight-average molecular weight of 100 to 2,000.

The component (b) is incorporated, when the component (a-1) is used as the component (a), at 30 to 150 parts by weight per 100 parts by weight of the component (a-1), preferably 50 to 120 parts by weight. At below 30 parts by weight, the resultant thermoplastic elastomer composition may have deteriorated moldability, excessively high hardness and deteriorated softness with the result that the composition may not yield rubber-touch product. At above 150 parts by weight, on the other hand, the resultant thermoplastic elastomer composition is liable to suffer bleed-out of the softening agent and formed article delamination and/or peeling of the components, deformation and flow marks on the surfaces.

The component (b) is incorporated, when the component (a-2) is used as the component (a), at 30 to 170 parts by weight per 100 parts by weight of the component (a-2), preferably 50 to 160 parts by weight. At below 30 parts by weight, the resultant thermoplastic elastomer composition may have deteriorated moldability, excessively high hardness and deteriorated softness with the result that the composition may not give the rubber-touch product. At above 170 parts by weight, on the other hand, the resultant thermoplastic elastomer composition is liable to suffer bleed-out of the softening agent and formed article delamination and/or peeling of the components, deformation and flow marks on the surfaces.

(3) Thermoplastic Resin Having a DSC-determined Melting Point of 70 to 140° C. and Melt Viscosity of 400 to 100,000 cps at 140° C. as the Component (c)

The thermoplastic resin component (c) for the thermoplastic elastomer composition of the present invention has the effects of accelerating dispersion of the rubber in the resultant thermoplastic elastomer composition, improving outer appearances of the formed article, and adjusting hardness and shrinkage.

The component (c) has a DSC-determined melting point (Tm) of 70 to 140° C., preferably 100 to 120° C. At a Tm of the component (c) out of the above range, the resultant thermoplastic elastomer composition may have deteriorated balances among softness, permanent compression set and moldability. Moreover, the component (c) has a melt viscosity of 400 to 100,000 cps at 140° C., preferably 500 to 10,000 cps. At a melt viscosity below 400 cps at 140° C., the resultant thermoplastic elastomer composition may have deteriorated rubber elasticity. At above 100,000 cps, it may have deteriorated moldability.

The thermoplastic resin as the component (c) is of at least one thermoplastic resin selected from the group consisting of non-polar resin and resin having a polar group. The non-polar resin useful for the component (c) includes polyolefin resins of low molecular weight and melting point, e.g., polyethylene and polypropylene, more specifically polyethylene wax. The resins having a polar group include those of low molecular weight and melting point, e.g., ionomer, ethylene/acrylic acid copolymer, ethylene/vinyl acetate copolymer, saponified ethylene/vinyl acetate copolymer, polyamide-based resin, polyamide-based thermoplastic elastomer, biodegradable polyester-based resin, polyester-based resin, polyester-based thermoplastic elastomer, polyurethane-based resin and polyurethane-based thermoplastic elastomer. These thermoplastic resins may be used either individually or in combination.

The preferable examples of the resins useful for the component (c) include polyethylene wax, which is non-polar, and biodegradable polyester-based resin, which has a polar group.

Polyethylene waxes useful for the present invention include polyethylene of branched homopolymer. The polyethylene wax has a melting point of 101 to 115° C., density of 0.91 to 0.93 g/cm$^3$ and viscosity of around 6,000 cps, determined at 140° C. by a Brookfield LVDVII+ viscometer (Spindle No.SC4-18, 60 rpm). This type of polyethylene wax includes A-C735 polyethylene wax supplied by US's Allied Signal (Morristown, N.J.).

The biodegradable polyester-based resins useful for the present invention include biodegradable aliphatic polyester. They include those synthesized on an industrial scale by the dehydration polycondensation and diol elimination reactions with an aliphatic dicarboxylic acid and an excess quantity of diol as the starting compounds; those incorporated with an aromatic compound; those produced by ring-opening polymerization of lactide and polycondensation of lactic acid; polycaprolactone of increased molecular weight; and polyglycolic acid synthesized from carbon monoxide and formalin.

Of the biodegradable aliphatic polyesters, the aliphatic-aromatic random copolyester is a copolymerized polyester-based resin of a diol, fatty acid and aromatic acid having a recurring unit of $[-\{(O-R^1-O)_a-(CO-R^2-CO)_b\}-\{(O-R^3-O)_c-(CO-Ar-CO)_d\}-]$. It may be incorporated with a branching agent $(BA)_x$ as an optional component to have the structure of $[-\{(O-R^1-O)_a-(CO-R^2-CO)_b\}-\{(O-R^3-O)_c-(CO-Ar-CO)_d\}-](BA)_x$.

In the above recurring unit, the fatty acid residue —CO—$R^2$—CO— has 3 to 40 carbon atoms, preferably 3 to 12 carbon atoms, wherein the fatty acid is selected from the group consisting of, e.g., malonic, succinic, glutaric, adipic, pimelic, azelaic, sebacic, fumaric, 2,2-dimethyl glutaric, suberic, 1,3-cyclopentane dicarboxylic, 1,4-cyclohexane dicarboxylic, 1,3-cyclohexane dicarboxylic, diglycolic, itaconic, maleic and 2,5-norbornane dicarboxylic acid. Moreover, hydroxyl acids, e.g., 4-(hydroxymethyl) cyclohexane carboxylic, hydroxypivalic, 6-hydroxyhexanoic, glycolic and lactic acid and an ester-forming derivative thereof are also useful as the fatty acid component for producing these copolyesters.

The aromatic acid residue —CO—Ar—CO— has 8 to 40 carbon atoms, preferably 8 to 14 carbon atoms, wherein the aromatic acid is selected from the group consisting of 1,4-terephthalic, 1,3-terephthalic, 2,6-naphthoic and 1,5-naphthoic acid, an ester-forming derivatives thereof, and a combination thereof.

The diol residue —O—$R^1$—O— or —O—$R^3$—O— has 2 to 20 carbon atoms, wherein diol is selected from the group consisting of ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, ,2,2,4-trimethyl-1,6-hexanediol, thiodiethanol, 1,3-cyclohexane dimethanol, 1,4-cyclohexane dimethanol, 2,2,4,4-tetramethyl-1,3-cyclobutanediol, triethylene glycol, tetraethylene glycol and a combination thereof. The diol components may be the same or different.

The branching agent $(BA)_x$ (where, x represents % by weight of the branching agent, preferably 0.01 to 10%, more preferably 0.1 to 1.0%) as an optional component preferably has a weight-average molecular weight of around 50 to 5,000, more preferably 92 to 3,000. The examples include polyol having 3 to 6 hydroxy groups, polycarboxylic acid having 3 or 4 carboxyl groups, and hydroxyl acid having a total of 3 to 6 hydroxyl and carboxyl groups. The low-molecular-weight polyols include glycerol, trimethylol propane, 1,2,4-butanetriol, pentaerythritol, 1,2,6-hexanetriol, sorbitol, 1,1,4,4-tetrakis(hydroxymethyl) cyclohexane, tris(2-hydroxyethyl)isocyanurate and dipentaerythritol. The high-molecular-weight polyols (Mw: 400 to 3,000) include triols produced by condensing alkylene oxides of 2 to 3 carbon atoms in the presence of a polyol as the initiator. The polycarboxylic acids include hemimellitic, trimellitic, trimesic, pyromellitic, benzene tetacarboxylic, benzophenone tetracarboxylic, 1,1,2,2-ethane tetracarboxylic, 1,1,2-ethane tricarboxylic, 1,3,5-pentane tricarboxylic and 1,2,3,4-cyclopentane tetracarboxylic acid. These acids may be used, but preferably used in the form of cyclic anhydride, when the lower alkyl ester or cyclic anhydride can be formed. The hydroxyl acids include malic, citric, tartaric, 3-hydroxyglutaric, mucic, trihydroxyglutaric and 4-(β-hydroxyethyl)phthalic acid. These hydroxyl acids include a total of 3 or more hydroxyl and carboxyl groups. Of these, more preferable branching agents are trimellitic and trimesic acid, pentaerythritol, trimethylol propane, and 1,2,4-butanetriol.

The biodegradable aliphatic-based polyesters suitably used in the present invention include polybutylene succinate (2-component condensate of succinic acid and 1,4-butanediol), polybutylene succinate adipate (3-component condensate of succinic acid, adipic acid and 1,4-butanediol) and polybutylene succinate terephthalate (3-component condensate of succinic acid, terephthalic acid and 1,4-butanediol).

The biodegradable aliphatic-based polyesters for the present invention may be incorporated with a reactive group, e.g., isocyanate or urethane group, in the structure to modify the functionality within limits not harmful to the biodegradability function.

Those commercially available as the biodegradable resins may be used as the biodegradable aliphatic-based polyesters for the present invention. These include BIONOLLE (Showa Highpolymer), Easter Bio (Eastoman Chemicals), BIOPOL (Monsanto Japan), Biomax (DuPont) and Ecoflex (BASF). The resin may be optionally selected depending on the specific purposes and characteristics.

The component (c) is incorporated at 3 to 100 parts by weight per 100 parts by weight of the component (a), preferably 10 to 50 parts by weight, more preferably 20 to 50 parts by weight. At below 3 parts by weight, the resultant thermoplastic elastomer composition may have deteriorated moldability, and the formed article is liable to suffer delamination and/or peeling of the components, deformation and flow marks on the surfaces.

At above 100 parts by weight, on the other hand, the resultant thermoplastic elastomer composition may also have deteriorated moldability, excessively high hardness and deteriorated softness with the result that the composition may not give the product a rubber-touch.

(4) Organic Peroxide as the Component (d)

The thermoplastic elastomer composition of the present invention may be incorporated with the organic peroxide component (d), as required. The organic peroxide component (d) works to generate the radicals which are reacted with each other in a chain reaction manner to crosslink the component (a). It also works to graft-polymerize the component (e) to (g) with the component (a), depending on situations. The compounds useful for the component (d) include dicumyl peroxide, di-tert-butyl peroxide, 2,5-dimethyl-2,5-di-(tert-butyl peroxy)hexane, 2,5-dimethyl-2,5-di-(tert-butyl peroxy)hexyne-3, 1,3-bis(tert-butyl peroxyisopropyl)benzene, 1,1-bis(tert-butyl peroxy)-3,3,5-trimethyl cyclohexane, n-butyl-4,4-bis(tert-butyl peroxy) valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, and tert-butylcumyl peroxide. Of these, 2,5-dimethyl-2,5-di-(tert-butyl peroxy)hexane and 2,5-dimethyl-2,5-di-(tert-butyl peroxy)hexyne-3 are particularly preferable for their characteristics related to odor, coloring and scorch safety.

The component (d) is incorporated at 0.01 to 3 parts by weight per 100 parts by weight of the component (a), preferably 0.05 to 1.0 parts by weight. At below 0.01 parts by weight, the resultant thermoplastic elastomer composition may have insufficient resistance to heat and mechanical strength, because of insufficient extent of crosslinking. At above 3 parts by weight, on the other hand, the resultant thermoplastic elastomer composition may have deteriorated moldability.

(5) Liquid Polybutadiene Containing Hydroxyl Group at the Terminal as the Component (e)

The thermoplastic elastomer composition of the present invention may be incorporated with a liquid polybutadiene containing hydroxyl group at the terminal as the component (e), as required, when the component (c) is a polar resin. The component (e) exhibits the effect of controlling bleed-out of the softening agent from the thermoplastic elastomer composition mainly by graft-polymerizing itself with the component (a) in the presence of a peroxide, while the elastomer composition is molten. The liquid polybutadiene containing hydroxyl group at the terminal as the component (e) is a transparent polymer liquid at room temperature, having the microscopic structure of the vinyl 1,2-bond, trans 1,4-bond and cis 1,4-bond type in the main chain. The vinyl 1,2-bond type preferably account for 30% by weight or less. At above 30% by weight, the resultant composition may have deteriorated low-temperature characteristics and hence is undesirable.

The liquid polybutadiene containing hydroxyl group at the terminal preferably contains the hydroxyl group at 0.05 to 3.0 mol/kg, determined in accordance with JIS K-1557, more preferably 0.1 to 1.5 mol/kg.

The liquid polybutadiene containing hydroxyl group at the terminal preferably has a number-average molecular weight of 1,000 to 5,000, more preferably 2,000 to 4,000. At a number-average molecular weight below 1,000, the resultant thermoplastic elastomer composition will have deteriorated resistance to deformation under heating. At above 5,000, on the other hand, the resultant thermoplastic elastomer composition will have deteriorated compatibility.

Moreover, the liquid polybutadiene containing hydroxyl group at the terminal may be a copolymerizable compound having one or more groups selected from the group consisting of epoxy, hydroxyl, isocyanate and carboxyl group. Of these, the one having hydroxyl group and copolymerization-reactive unsaturated double bond is particularly preferable. It is commercially available, one example being R-45HT™, supplied by Idemitsu Petrochemical.

The component (e) is incorporated, when it is used, at 0.1 to 5 parts by weight per 100 parts by weight of the component (a), preferably 0.1 to 3 parts by weight, more preferably 0.1 to 2 parts by weight. At below 0.1 parts by weight, the resultant thermoplastic elastomer composition may have insufficient compatibility and deteriorated moldability, when the component (c) is a resin having a polar group. At above 5 parts by weight, on the other hand, the formed article of the resultant thermoplastic elastomer composition may be sticky, because of bleed-out of the component (e).

(6) Unsaturated Glycidyl Compound or Derivative Thereof as the Component (f)

The thermoplastic elastomer composition of the present invention may be incorporated with an unsaturated glycidyl compound or derivative thereof as the component (f), as required, when the component (c) is a polar resin. The component (f) is used as the modifier. It preferably has, in the molecule, an unsaturated group capable of copolymerizing with the olefin composition in addition to a glycidyl group. The particularly preferable glycidyl compound is glycidyl methacrylate (GMA). The modifier works to modify the soft component of the block copolymer and the hydrogenated block copolymer in the elastomer component (a), to improve compatibility with the resin having a polar group.

The component (f) is incorporated, when it is used, at 0.1 to 5 parts by weight per 100 parts by weight of the component (a), particularly preferably 0.1 to 1 part. At above 5 parts by weight, the resultant thermoplastic elastomer may have deteriorated resistance to deformation under heating and mechanical characteristics, and, when the component (c) has a polar group, the component (f) may no longer exhibit the effect of improving compatibility.

(7) Unsaturated Carboxylic Acid or Derivative Thereof as the Component (g)

The thermoplastic elastomer composition of the present invention may be incorporated with an unsaturated carboxylic acid or derivative thereof as the component (g), as required, when the component (c) is a polar resin. The component (g) is used as the modifier. It is preferably acrylic, methacrylic, maleic or dicarboxylic acid or a derivative thereof, e.g., acid, halide, amide, imide, anhydride or ester, of which maleic anhydride (MAH) is particularly preferable. The modifier works to modify the component (a), to improve compatibility with the resin having a polar group.

The component (g) is incorporated, when it is used, at 0.1 to 5 parts by weight per 100 parts by weight of the component (a), particularly preferably 0.1 to 1 part by weight. At above 5 parts by weight, the resultant thermoplastic elastomer may greatly turn yellow, have deteriorated resistance to deformation under heating and mechanical characteristics, and, when the component (c) has a polar group, the component (g) may no longer exhibit the effect of improving compatibility.

(8) Ester-based Crosslinking Aid as the Component (h)

The thermoplastic elastomer composition of the present invention may be incorporated with an ester-based crosslinking aid as the component (h), as required. The component (h) may be incorporated during the crosslinking step in the presence of the organic peroxide as the component (d) in the production of the thermoplastic elastomer composition, for the uniform and efficient crosslinking reactions. When used in a large quantity, it can adequately crosslink the non-aromatic-based softening agent for rubber, in particular low-molecular-weight paraffin-based oil, to control its bleed-out from the thermoplastic elastomer composition.

The compounds useful for the component (h) include multi-functional methacrylate compounds, e.g., triallyl cyanurate, ethylene glycol dimethacrylate, diethylene glycol dimethacrylate, triethylene glycol dimethacrylate, tetraethylene glycol dimethacrylate, polyethylene glycol dimethacrylate having 9 to 14 recurring units of ethylene glycol, trimethylol propane trimethacrylate, allylmethacrylate, 2-methyl-1,8-octanediol dimethacrylate and 1,9-nonanediol dimethacrylate; multi-functional acrylate compounds, e.g., polyethylene glycol diacrylate, 1,6-hexanediol diacrylate, neopentyl glycol diacrylate and propylene glycol diacrylate; and multi-functional vinyl compounds, e.g., vinyl butylate and vinyl stearate. They may be used either individually or in combination. Of these crosslinking aids, the multi-functional acrylate and methacrylate compounds are more preferable, and triethylene glycol dimethacrylate and tetraethylene glycol dimethacrylate are still more preferable. These compounds are easily handled, function to solubilize the organic peroxide and hence as the dispersion aid for the peroxide, and promote the uniform and efficient crosslinking reactions under heating, to give the thermoplastic elastomer composition of well-balanced hardness and rubber elasticity.

The component (h) is incorporated, when it is used, preferably at 0.1 to 10 parts by weight per 100 parts by weight of the component (a), more preferably 0.1 to 3 parts by weight. At above 10 parts by weight, it may no longer exhibit its effect, because the resultant thermoplastic elastomer has a decreased extent of crosslinking due to the self-polymerization.

(9) Peroxide-decomposed Type Polyolefin Resin as the Component (i)

The thermoplastic elastomer composition of the present invention may be incorporated with a peroxide-decomposed type polyolefin resin as the component (i), as required. The component (i) can significantly improve ability of thermal adhering of the formed article of the resultant thermoplastic elastomer with a formed article of peroxide-decomposed type polyolefin resin.

The component (i) is composed of an olefin-based polymer or copolymer, thermally decomposed under heating in the presence of a peroxide to lose its molecular weight and have increased fluidity while being molten. The compounds useful for the component (i) include isotactic polypropylene or copolymers of propylene with another α-olefin compound, e.g., ethylene, 1-butene, 1-hexene, 4-methyl-1-pentene or 1-octene.

The homopolymer portion of the above olefin-based copolymer preferably has a DSC-determined melting point (Tm) of 150 to 167° C., and ΔHm of 25 to 83 mJ/mg. Degree of crystallinity can be estimated from the DSC-determined Tm and ΔHm. The resultant thermoplastic elastomer composition may no longer exhibit improved resistance to oil and rubber elasticity at 100° C. or higher, when the homopolymer portion has the Tm or ΔHm out of the above range.

The component (i) preferably has a melt flow rate (MFR, determined at 230° C. in accordance with ASTM D-1238) of 0.1 to 200 g/10 minutes, more preferably 0.5 to 100 g/10 minutes. At an MFR below 0.1 g/10 minutes, the resultant thermoplastic elastomer composition may have deteriorated moldability. At above 200 g/10 minutes, on the other hand, it may have deteriorated rubber elasticity.

The component (i) is incorporated, when it is used, preferably at 0.1 to 25 parts by weight per 100 parts by weight of the component (a), more preferably 1 to 20 parts by weight. At above 25 parts by weight, the resultant thermoplastic elastomer may have deteriorated softness and rubber elasticity.

(10) Other Components (j)

The thermoplastic elastomer composition of the present invention may be incorporated with one or more types of additives, in addition to the above-described components, as required. These additives include various types of blocking inhibitors, sealing improvers, heat stabilizers, antioxidants, light stabilizers, ultraviolet ray absorbers, lubricants, nucleating agents and colorants. The antioxidants useful for the present invention include phenol-based ones, e.g., 2,6-di-tert-p-butyl-p-cresol, 2,6-di-tert-butyl phenol, 2,4-dimethyl-6-tert-butyl phenol, 4,4-dihydroxydiphenyl and tris(2-methyl-4-hydroxy-5-tert-butylphenyl)butane; phosphate-based ones; and thioether-based ones. Of these, phenol- and phosphate-based ones are particularly preferable. The antioxidant is incorporated preferably at 0 to 3.0 parts by weight per 100 parts by weight of the components (a) to (i) totaled, particularly preferably 0.1 to 1.0 parts by weight.

2. Method of Producing the Thermoplastic Elastomer Composition

The thermoplastic elastomer composition of the present invention can be produced by kneading the components (a) to (c), and, as required, optional components (d) to (j), which may be incorporated simultaneously or in an optional sequence.

The melting/kneading method is not limited, and the known method may be used. For example, these components may be molten and kneaded by a single-screw extruder, twin-screw extruder, roll, Banbury mixer, or various types of kneader.

The melting and kneading steps may be effected continuously by, e.g., a twin-screw extruder of adequate L/D ratio, Banbury mixer or kneader. The preferable melting/kneading temperature is 160 to 220° C.

3. Formed Article and Composite Formed Article of the Thermoplastic Elastomer Composition The thermoplastic elastomer composition of the present invention has adequate softness and permanent compression set, in particular excellent compression set at 70° C. or lower, and causes no environmental pollution, because the formed article suffers only a limited extent of bleed-out of the softening agent even when exposed to an excessive stress-induced deformation or load.

Therefore, the thermoplastic elastomer composition of the present invention can go into various areas, when formed into a shape, e.g., sealing parts for medical and food purposes, electric appliance parts, bottle cap packings, sealing parts for automobiles, and multi-color sealing parts formed with a polyolefin or hard thermoplastic elastomer. It is particularly useful for sealing parts of ink in a bubble jet printer or the like.

The thermoplastic elastomer composition of the present invention is excellent in ability of thermal adhering with a polyolefin resin, in particular polypropylene-based resin. Therefore, the formed article of the thermoplastic elastomer composition can be easily thermal adhered with a formed article of polypropylene-based resin to form the thermal adhesiveness composite article.

The concrete examples of the thermal adhesiveness composite articles include sealing parts for medical and food purposes, electric appliance parts, bottle cap packings, sealing parts for automobiles, and multi-color sealing parts. The composite articles are particularly useful for sealing parts of ink in a bubble jet printer or the like.

EXAMPLES

The present invention is described in more detail by EXAMPLES and COMPARATIVE EXAMPLES, which by no means limit the present invention.

The properties of each composition were determined by the following methods.

(1) Specific gravity: Specific gravity was determined in accordance with JIS K-7112 for the 1mm thick pressed sheet.
(2) Hardness: Hardness was determined in accordance with JIS K-7215 for the 6.3 mm thick pressed sheet using a durometer (hardness type A).
(3) Tensile strength: Tensile strength was determined in accordance with JIS K-6301 for the 1 mm thick pressed sheet punched into the No.3 dumb-bell shape at a tensile speed of 500 mm/minute.

(4) 100% elongation stress: 100% elongation stress was determined in accordance with JIS K-6301 for the 1 mm thick pressed sheet punched into the No.3 dumb-bell shape at a tensile speed of 500 mm/minute.

(5) Breaking extension: Breaking extension was determined in accordance with JIS K-6301 for the 1 mm thick pressed sheet punched into the No.3 dumb-bell shape at a tensile speed of 500 mm/minute.

(6) Permanent compression set: Permanent compression set was determined in accordance with JIS K-6262 for the 6.3 mm thick pressed sheet after it was set at a deformation of 25% at 70° C. for 22 hours.

(7) Resistance to bleeding: The formed article was compressed at 25% at 70° C. for 168 hours, and visually observed for the bleeding and blooming of the low-molecular-weight components, to determine its resistance to bleeding according to the following standards:
◎: Very good
○: Good
Δ: Slightly bad
x: Bad (8) Resistance to tacking: Two 1 mm thick pressed sheets, described above, were put one on another to prepare the test piece, which was kept under a load of 500 g/cm$^2$ for 24 hours and visually observed for separated conditions of the pressed sheets, to determine its resistance to tacking according to the following standards:
◎: Very good
○: Good
Δ: Slightly bad
x: Bad (9) Injection moldability: The 130 by 130 by 2 mm injection-molded sheet was visually observed for flow marks and sinks on the surfaces, to determine its injection moldability according to the following standards:
◎: Very good
o: Good
Δ: Slightly bad
x: Bad

(10) Thermal adhering: The test piece 1 shown in FIGS. 1 to 3 was tested by the 180 degree peel back strength test, to determine its peel back strength.

Figure 2:
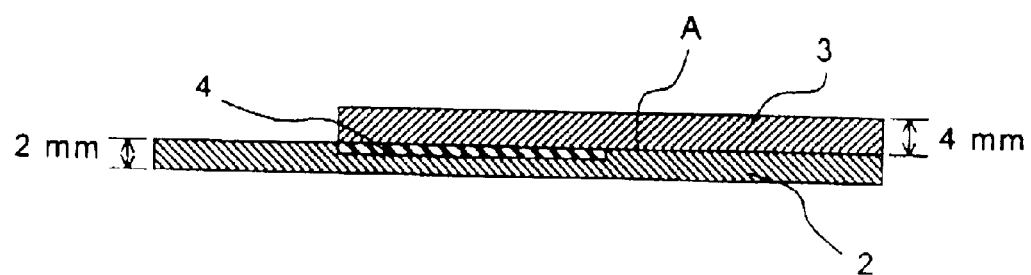
FIG. 2 is a cross-sectional view of the test piece for determining peel back strength.
Figure 3:
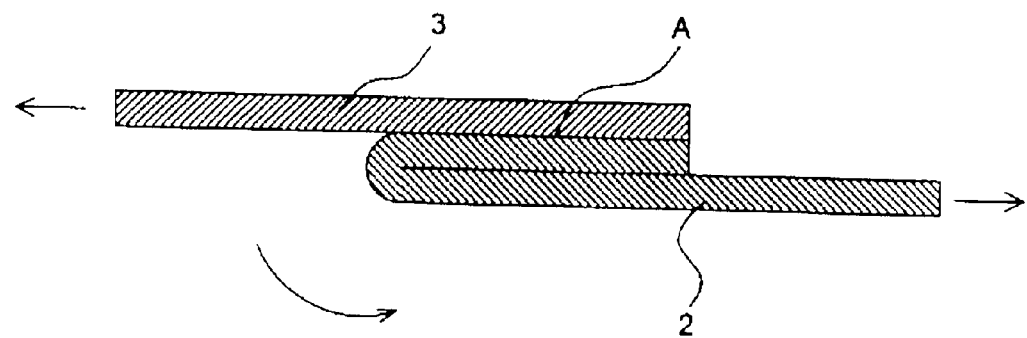
FIG. 3 is a cross-sectional view of the test piece for explaining the method of determining peel back strength.

Referring to FIGS. 1 to 3, the polypropylene resin plate 3, 150 mm long, 25 mm wide and 4 mm thick, was prepared by injection molding under the following injection conditions. The resin for the test plate is described below. Polypropylene resin: PP-BC8 (Japan Polychem), Degree of crystallinity: Tm 166° C., ΔHm: 82 mJ/mg, MFR: 1.8 g/10 minutes
(The Injection Molding Conditions were Those Recommended by the Resin Maker)

| Injection molder | FS-120 (Nissei Plastic Industrial) |
|---|---|
| Forming temperature | 180 to 220° C. |
| Mold temperature | 40° C. |
| Injection speed | 55 mm/second |
| Injection pressure | 1,400 kg/cm$^2$ |
| Dwelling pressure | 400 kg/cm$^2$ |
| Injection time | 6 seconds |
| Cooling time | 45 seconds |

The paper 4 was put on part of the polypropylene resin 3 by a double-faced tape. It was inserted in a mold, and the thermoplastic elastomer composition was injected into the mold under the following conditions, to prepare the test piece of the polypropylene resin plate 3 and thermoplastic elastomer composition plate 2 thermally adhered to each other at the area A.

| Injection molder | FS-120 (Nissei Plastic Industrial) |
|---|---|
| Forming temperature | 180 to 220° C. |
| Mold temperature | 40° C. |
| Injection speed | 55 mm/second |
| Injection pressure | 1,400 kg/cm$^2$ |
| Dwelling pressure | 0 kg/cm$^2$ |
| Injection time | 6 seconds |
| Cooling time | 45 seconds |

The test piece thus prepared was tested by the 180 degree peel back strength test, where the thermoplastic elastomer composition plate 2 was folded as shown in FIG. 3, and the end of the plate 2 and that of the plate 3 were pulled in the arrowed directions, to determine the 180 degree peel back strength according to the following standards:

◎: Breaking of the material
Δ: Breaking at the interface
x: The plates separated from each other immediately after the test was started The composition components used in EXAMPLES and COMPARATIVE EXAMPLES are described below:

(1) Hydrogenated block copolymer as the component (a-1; SEPS): SEPTON 4077 (Kuraray), Styrene content: 30% by weight, Number-average molecular weight: 260,000, Weight-average molecular weight: 320,000, Molecular weight distribution: 1.23, Degree of hydrogenation: 90% or more
(2) Hydrogenated block copolymer of conjugated diene compound as the component (a-2; CEBC): DYNARON 6100P(JSR Corp.)
(3) Paraffin oil as the component (b): PW 90(Idemitsu Chemical), Number-average molecular weight: 980
(4) Polyethylene wax as the component (c-1): A-C735 (Allied Signal), Melting point: 110° C., Specific gravity: 0.92, Melt viscosity at 140° C.: 6,000 cps
(5) Biodegradable polyester-based resin as the component (c-2): Easter Bio GP Copolyester (Eastman Chemical), Melting point: 108° C., Specific gravity: 1.22, Melt viscosity at 140° C.: 85,000 cps
(6) Organic peroxide as the component (d): PERHEXA-25B (NOF Corp.)
(7) Liquid polybutadiene containing hydroxyl group at the terminal as the component (e): R-45HT (Idemitsu Petrochemical), Containing hydroxyl group as the functional group (0.83 mol/kg) and copolymerization-reactive unsaturated double bond (1,4 bond: 80%), Number-average molecular weight: 2,800
(8) Unsaturated glycidyl compound as the component (f): Glycidyl methacrylate (GMA) (NOF Corp.)
(9) Unsaturated carboxylic acid as the component (g): Maleic anhydride (MAH), (NOF Corp.)
(10) Crosslinking aid as the component (h): NK ESTER 3G (Shin-Nakamura Chemical)
(11) Peroxide-decomposed type olefin-based resin as the component (i): PP-BC8 (Polypropylene (PP); Japan Polychem), Degree of crystallinity: Tm 166° C., ΔHm: 82 mJ/mg, MFR: 1.8 g/10 minutes
(12) Antioxidant of hindered phenol/phosphate/lactone-based composite as the component (j): HP2215 (Ciba Speciality Chemicals)

Examples 1 to 8, and Comparative Examples 1 to 16

The components shown in Tables 1 to 4 were melted/kneaded into pellets by a twin-screw extruder (L/D=47) at 180° C. and 350 rpm as the screw speed. The resultant pellets were injection-molded to prepare the test pieces which were tested for various characteristics. The results are given in Tables 1 to 4.

TABLE 1

| | | | EXAMPLES | | | |
|---|---|---|---|---|---|---|
| | | | 1 | 2 | 3 | 4 |
| Composition | Component (a-1) SEPS | pbw | 100 | 100 | 100 | 100 |
| | Component (b) PW90 | pbw | 100 | 100 | 100 | 100 |
| | Component (c-1) A-C753 | pbw | 20 | 10 | 0 | 20 |
| | Component (c-2) Easter Bio GP | pbw | 0 | 15 | 25 | 0 |
| | Component (d) Peroxide | pbw | 0.15 | 0.15 | 0.15 | 0 |
| | Component (e) Polybutadiene | pbw | 0 | 2.0 | 2.0 | 0 |
| | Component (f) GMA | pbw | 0 | 0.4 | 0.4 | 0 |
| | Component (g) MAH | pbw | 0 | 0.5 | 0.5 | 0 |
| | Component (h) NK Ester 3G | pbw | 0.5 | 0.5 | 0.5 | 0.5 |
| | Component (j) Antioxidant | pbw | 0.5 | 0.5 | 0.5 | 0.5 |
| Evaluation results | Specific gravity | | 0.90 | 0.91 | 0.92 | 0.92 |
| | Hardness | HDA | 25 | 26 | 23 | 21 |
| | Tensile strength | MPa | 4.6 | 5.1 | 5.8 | 5.4 |
| | 100% Stress | MPa | 0.8 | 0.8 | 1.1 | 0.6 |
| | Breaking extension | % | 730 | 620 | 540 | 1050 |
| | Permanent compression set (PCS) (70° C. for 22 hours) | % | 28 | 25 | 28 | 23 |
| | Resistance to bleeding (70° C. for 168 hours, after PCS) | Visually observed | ◉ | ◉ | ◉ | ○ |
| | Resistance to tacking | Visually observed | ◉ | ◉ | ◉ | ○ |
| | Injection moldability | Visually observed | ◉ | ◉ | ◉ | ○ |

TABLE 2

| | | | EXAMPLES | | | |
|---|---|---|---|---|---|---|
| | | | 5 | 6 | 7 | 8 |
| Composition | Component (a-1) CEBC | pbw | 100 | 100 | 100 | 100 |
| | Component (b) PW90 | pbw | 100 | 100 | 100 | 100 |
| | Component (c-1) A-C753 | pbw | 20 | 10 | 0 | 20 |
| | Component (c-2) Easter Bio GP | pbw | 0 | 15 | 25 | 0 |
| | Component (d) Peroxide | pbw | 0.15 | 0.15 | 0.15 | 0 |
| | Component (e) Polybutadiene | pbw | 0 | 2.0 | 2.0 | 0 |
| | Component (f) GMW | pbw | 0 | 0.4 | 0.4 | 0 |
| | Component (g) MAH | pbw | 0 | 0.5 | 0.5 | 0 |
| | Component (h) NK Ester 3G | pbw | 0.5 | 0.5 | 0.5 | 0.5 |
| | Component (i) PP | pbw | 5 | 5 | 5 | 5 |
| | Component (j) Antioxidant | pbw | 0.5 | 0.5 | 0.5 | 0.5 |
| Evaluation Results | Specific gravity | | 0.90 | 0.91 | 0.92 | 0.92 |
| | Hardness | HDA | 27 | 29 | 25 | 24 |
| | Tensile strength | MPa | 4.8 | 5.3 | 6.0 | 5.6 |
| | 100% Stress | MPa | 0.9 | 1.0 | 1.3 | 0.8 |
| | Breaking extension | % | 650 | 580 | 510 | 780 |
| | Permanent compression set (PCS) (70° C. for 22 hours) | % | 32 | 28 | 32 | 25 |
| | Resistance to bleeding (70° C. for 168 hours, after PCS) | Visually observed | ◉ | ◉ | ◉ | ○ |
| | Resistance to tacking | Visually observed | ◉ | ◉ | ◉ | ○ |
| | Injection moldability | Visually observed | ◉ | ◉ | ◉ | ○ |
| | PP fusibility | Visually observed | ◉ | ◉ | ◉ | ◉ |

TABLE 3

| | | | COMPARATIVE EXAMPLES | | | | | | | |
|---|---|---|---|---|---|---|---|---|---|---|
| | | | 1 | 2 | 3 | 4 | 5 | 6 | 7 | 8 |
| Composition | Component (a-1) SEPS | pbw | 100 | 100 | 100 | 100 | 100 | 100 | 100 | 100 |
| | Component (b) PW90 | pbw | 20 | 180 | 100 | 100 | 20 | 180 | 100 | 100 |
| | Component (c-1) A-C753 | pbw | 20 | 20 | 2 | 130 | 20 | 20 | 2 | 130 |
| | Component (c-2) Easter Bio GP | pbw | 0 | 0 | 0 | 0 | 0 | 0 | 0 | 0 |
| | Component (d) Peroxide | pbw | 0.15 | 0.15 | 0.15 | 0.15 | 0 | 0 | 0 | 0 |
| | Component (e) Polybutadiene | pbw | 0 | 0 | 0 | 0 | 0 | 0 | 0 | 0 |
| | Component (f) GMA | pbw | 0 | 0 | 0 | 0 | 0 | 0 | 0 | 0 |
| | Component (g) MAH | pbw | 0 | 0 | 0 | 0 | 0 | 0 | 0 | 0 |
| | Component (h) NK Ester 3G | pbw | 0.5 | 0.5 | 0.5 | 0.5 | 0.5 | 0.5 | 0.5 | 0.5 |
| | Component (j) Antioxidant | pbw | 0.5 | 0.5 | 0.5 | 0.5 | 0.5 | 0.5 | 0.5 | 0.5 |
| Evaluation Results | Specific gravity | | 0.91 | 0.89 | 0.90 | 0.90 | 0.91 | 0.89 | 0.90 | 0.90 |
| | Hardness | HDA | 56 | 16 | 13 | 68 | 52 | 12 | 9 | 62 |
| | Tensile strength | MPa | 6.1 | 2.8 | 2.1 | 6.5 | 6.3 | 1.8 | 1.2 | 7.1 |
| | 100% Stress | MPa | 1.2 | 0.5 | 0.4 | 1.1 | 0.4 | 0.3 | 0.1 | 0.6 |
| | Breaking extension | % | 560 | 480 | 890 | 720 | 480 | 520 | 950 | 780 |
| | Permanent compression set (PCS) (70° C. for 22 hours) | % | 46 | 35 | 22 | 57 | 42 | 35 | 24 | 54 |
| | Resistance to bleeding (70° C. for 168 hours, after PCS) | Visually observed | ○ | X | ○ | ○ | ○ | X | X | X |
| | Resistance to tacking | Visually observed | ○ | X | ○ | ○ | ○ | X | X | X |
| | Injection moldability | Visually observed | X | X | X | X | X | X | X | X |

TABLE 4

| | | | COMPARATIVE EXAMPLES | | | | | | | |
|---|---|---|---|---|---|---|---|---|---|---|
| | | | 9 | 10 | 11 | 12 | 13 | 14 | 15 | 16 |
| Composition | Component (a-1) CECB | pbw | 100 | 100 | 100 | 100 | 100 | 100 | 100 | 100 |
| | Component (b) PW90 | pbw | 20 | 180 | 100 | 100 | 20 | 180 | 100 | 100 |
| | Component (c-1) A-C753 | pbw | 20 | 20 | 2 | 130 | 20 | 20 | 2 | 130 |
| | Component (c-2) Easter Bio GP | pbw | 0 | 0 | 0 | 0 | 0 | 0 | 0 | 0 |
| | Component (d) Peroxide | pbw | 0.15 | 0.15 | 0.15 | 0.15 | 0 | 0 | 0 | 0 |
| | Component (e) Polybutadiene | pbw | 0 | 0 | 0 | 0 | 0 | 0 | 0 | 0 |
| | Component (f) GMA | pbw | 0 | 0 | 0 | 0 | 0 | 0 | 0 | 0 |
| | Component (g) MAH | pbw | 0 | 0 | 0 | 0 | 0 | 0 | 0 | 0 |
| | Component (h) NK Easter 3G | pbw | 0.5 | 0.5 | 0.5 | 0.5 | 0.5 | 0.5 | 0.5 | 0.5 |
| | Component (i) PP | pbw | 5 | 5 | 5 | 5 | 5 | 5 | 5 | 5 |
| | Component (j) Antioxidanat | pbw | 0.5 | 0.5 | 0.5 | 0.5 | 0.5 | 0.5 | 0.5 | 0.5 |
| Evaluation results | Specific gravity | — | 0.91 | 0.89 | 0.90 | 0.90 | 0.91 | 0.89 | 0.90 | 0.90 |
| | Hardness | HDA | 58 | 19 | 16 | 72 | 55 | 16 | 13 | 65 |
| | Tensile strength | MPa | 6.3 | 2.9 | 2.3 | 6.7 | 6.5 | 2.1 | 1.5 | 7.6 |
| | 100% Stress | MPa | 1.3 | 0.7 | 0.5 | 1.3 | 0.6 | 0.5 | 0.2 | 0.7 |
| | Breaking extension | % | 450 | 420 | 850 | 650 | 430 | 480 | 820 | 630 |
| | Permanent compression set (PCS) (70° C. for 22 hours) | % | 50 | 38 | 25 | 61 | 45 | 41 | 30 | 63 |
| | Resistance to bleeding (70° C. for 168 hours, after PCS) | Visually observed | ○ | X | ○ | ○ | ○ | X | X | X |
| | Resistance to tacking | Visually observed | ○ | X | ○ | ○ | ○ | X | X | X |
| | Injection moldability | Visually observed | X | X | X | X | X | X | X | X |
| | PP fusibility | Visually observed | ⊙ | ⊙ | ⊙ | ⊙ | ⊙ | ⊙ | ⊙ | ⊙ |

As shown in Tables 1 and 2, each of the thermoplastic elastomer compositions prepared in EXAMPLES 1 to 8 was the composition of the present invention. It had good properties, whether or not it contained the optional components (d) to (j). The thermoplastic elastomer composition prepared in EXAMPLE 4 was particularly excellent in properties related to resealing and safety for medical equipment parts (Food Hygiene Act; standards for foods and additives (Notification No.370 of the Japanese Ministry of Health and Welfare issued in 1959), standards for tools and container wrappings of synthetic resin mainly composed of polystyrene (Notification No.20 of the Japanese Ministry of Health and Welfare issued in 1982)).

The thermoplastic elastomer composition of the present invention, prepared by incorporating PP in the composition prepared in each of EXAMPLES 1 to 4 at 5 parts by weight per 100 parts by weight of SEPS, showed good ability of thermal adhering with a formed article of PP.

The similarly good results were observed when the component (a-1) was replaced by DYNARON 6100P (JSR Corp.) as the component (a-2), which is a block copolymer (CEBC) of a conjugated diene compound, obtained by hydrogenating a block copolymer composed of the crystalline ethylene block and non-crystalline ethylene-butene block. The composition prepared in each of EXAMPLES 5 to 8 contained PP and showed good ability of thermal adhering with a formed article of PP.

On the other hand, the composition prepared in each of COMPARATIVE EXAMPLES 1 to 2 and 9 to 10 contained the component (b) at a content out of the range for the present invention. When the component (b) was contained at a content below the range for the present invention, the resulting thermoplastic elastomer composition had an excessively high hardness, lost softness, could not give a product of rubber touch, and had deteriorated injection moldability. When the component (b) was contained at a content above the range, the resulting thermoplastic elastomer composition suffered notable bleeding, and had deteriorated resistance to tacking and injection moldability. The composition prepared in each of COMPARATIVE EXAMPLES 3 to 4 and 11 to 12 contained the component (c-1) at a content out of the range for the present invention. When the component (c-1) was contained at a content below the range for the present invention, the resulting thermoplastic elastomer composition had deteriorated injection moldability. When the component (c-1) was contained at a content above the range, the resulting thermoplastic elastomer composition lost softness, and had deteriorated rubber elasticity and injection moldability. The composition prepared in each of COMPARATIVE EXAMPLES 5 to 6 and 13 to 14 contained the component (b) at a content out of the range for the present invention. When the component (b) was contained at a content below the range for the present invention, the resulting thermoplastic elastomer composition had an excessively high hardness, lost softness, could not give the product of rubber touch, and had deteriorated injection moldability. When the component (b) was contained at a content above the range, the resulting thermoplastic elastomer composition suffered notable bleeding, had deteriorated resistance to tacking and injection moldability, and was insufficient in safety for medical equipment parts. The composition prepared in each of COMPARATIVE EXAMPLES 7 to 8 and 15 to 16 contained the component (c-1) at a content out of the range for the present invention. When the component (c-1) was contained at a content below the range for the present invention, the resulting thermoplastic elastomer composition had deteriorated injection moldability. When the component (c-1) was contained at a content above the range, the resulting thermoplastic elastomer composition lost softness, had deteriorated rubber elasticity and injection moldability, and was not sufficiently safe for medical equipment parts.

The thermoplastic elastomer composition of the present invention is controlled in bleed-out of the softening agent, excellent in softness and in permanent compression set; and the formed article of the thermoplastic elastomer composition of the present invention causes no pollution of the ambient environment and can be used as excellent parts for various purposes. In particular, it causes no deterioration of ink when used for the elastic part or the like for a bubble jet printer, it causes no deterioration of the content in a bottle when used for the bottle cap packing or the like, and it causes no bleeding when used for the formed composite articles, e.g., multi-color sealing parts or the like formed with a polyolefin or hard, thermoplastic elastomer, which are represented by the sealing parts for medical purposes, food purposes and electric appliances.

What is claimed is:

1. A thermoplastic elastomer composition containing:
   (a) 100 parts by weight of at least one hydrogenated block copolymer selected from the group consisting of:
   (a-1) a hydrogenated block copolymer obtained by hydrogenating a block copolymer composed of at least 2 polymer blocks A mainly based on an aromatic vinyl compound and at least one polymer block B mainly based on a conjugated diene compound, and
   (a-2) a hydrogenated block copolymer obtained by hydrogenating a block copolymer based on a conjugated diene compound;
   (b) 30 to 150 parts by weight of a non-aromatic-based softening agent for rubber; and
   (c) 3 to 100 parts by weight of a thermoplastic resin having a melting point of 70 to 140° C., determined by the DSC analysis, and melt viscosity of 400 to 100,000 cps at 140° C.

2. The thermoplastic elastomer composition according to claim 1 which further contains (d) 0.01 to 3 parts by weight of an organic peroxide.

3. The thermoplastic elastomer composition according to claim 1 or 2, wherein said thermoplastic resin as the component (c) is of at least one thermoplastic resin selected from the group consisting of non-polar resin and polar resin.

4. The thermoplastic elastomer composition according to claim 3, wherein said non-polar resin is a polyethylene wax.

5. The thermoplastic elastomer composition according to claim 3, wherein said polar resin is of at least one of the resins selected from the group consisting of ionomer, ethylene/acrylic acid copolymer, ethylene/vinyl acetate copolymer, saponified ethylene/vinyl acetate copolymer, polyamide-based resin, polyamide-based thermoplastic elastomer, biodegradable polyester-based resin, polyester-based resin, polyester-based thermoplastic elastomer, polyurethane-based resin and polyurethane-based thermoplastic elastomer.

6. The thermoplastic elastomer composition according to claim 3 which further contains (e) 0.1 to 5 parts by weight of liquid polybutadiene containing hydroxyl group at the terminal or derivative thereof, when said component (c) is a polar resin.

7. The thermoplastic elastomer composition according to claim 3 which further contains (f) 0.1 to 5 parts by weight of an unsaturated glycidyl compound or derivative thereof, when said component (c) is a polar resin.

8. The thermoplastic elastomer composition according to claim 3 which further contains (g) 0.1 to 5 parts by weight of an unsaturated carboxylic acid or derivative thereof, when said component (c) is a polar resin.

9. The thermoplastic elastomer composition according to claim 1 or 2 which further contains (h) 0.1 to 10 parts by weight of an ester-based crosslinking aid.

10. The thermoplastic elastomer composition according to claim 1 or 2 which further contains (i) 0.1 to 25 parts by weight of a peroxide-decomposed type polyolefin resin.

11. A formed article composed of the thermoplastic elastomer composition according to one of claim 1 or 2.

12. An elastic part composed of the formed article according to claim 11 for medical, food or bubble jet printer purpose.

13. A thermal adhesiveness formed composite article composed of the formed article according to claim 11 and a formed article of polypropylene-based resin adhered to each other under heating.

14. An elastic part composed of the thermal adhesiveness formed article according to claim 13 for medical, food or bubble jet printer purpose.

* * * * *